United States Patent [19]

Asai

[11] Patent Number: 5,781,674
[45] Date of Patent: Jul. 14, 1998

[54] FERRULE FOR OPTICAL FIBER CONNECTOR

[75] Inventor: Akio Asai, Adachi-ku, Japan

[73] Assignee: Adamant Kogyo Company Ltd., Tokyo, Japan

[21] Appl. No.: 363,837

[22] Filed: Dec. 27, 1994

[30] Foreign Application Priority Data

Dec. 28, 1993 [JP] Japan ................... 5-353238

[51] Int. Cl.⁶ ............................................. G02B 6/38
[52] U.S. Cl. ................... 385/78; 385/60; 385/72; 385/85
[58] Field of Search .................... 385/78, 60, 72, 385/85, 11

[56] References Cited

U.S. PATENT DOCUMENTS

| | | | |
|---|---|---|---|
| 4,185,883 | 1/1980 | Chown et al. | 385/78 |
| 4,218,113 | 8/1980 | Uberbacher | 385/72 |
| 4,246,427 | 1/1981 | Andoh et al. | 562/535 |
| 4,652,411 | 3/1987 | Swarr et al. | 264/43 |
| 4,781,431 | 11/1988 | Wesson et al. | 385/78 |
| 4,931,120 | 6/1990 | Christoff | 156/153 |
| 5,251,277 | 10/1993 | Young, Jr. | 385/11 |

FOREIGN PATENT DOCUMENTS

| | | | |
|---|---|---|---|
| 61-99107 | 5/1986 | Japan | 385/85 |
| 62-220908 | 9/1987 | Japan . | |
| 7-191232 | 7/1995 | Japan . | |

*Primary Examiner*—Rodney B. Bovernick
*Assistant Examiner*—Yisun Song
*Attorney, Agent, or Firm*—Sherman and Shalloway

[57] ABSTRACT

A ferrule for an optical fiber connector, through which an end of an optical fiber to be connected is inserted to fix the optical fiber thereto, is disclosed. In the ferrule, a boundary part between an optical fiber-inserting hole and an optical fiber-inserting opening is formed into a continuously curved surface. The surface defining the optical fiber-inserting hole is an unabraded surface formed of a material as calcined, whereby a slightly irregular grain boundary surface composed of particles 0 the material is formed at such a surface.

18 Claims, 1 Drawing Sheet

FERRULE FOR OPTICAL FIBER CONNECTOR

BACKGROUND OF THE INVENTION

1. Field of the Invention

The present invention relates to a ferrule for an optical fiber connector, particularly to a ferrule which causes neither damage nor break to an optical fiber strand when it is inserted into the ferrule, and more particularly to a ferrule capable of fixing an optical fiber with high bond strength.

2. Description of the Background Art

In a connector suitable for use in connecting optical fibers used in optical communication or so to each other, a ferrule through which an end of the optical fiber to be connected is inserted to fix the optical fiber thereto is a part of which very high working accuracy is required under the necessity of bringing the respective ends of the optical fibers thin in diameter into exact contact with each other. Materials excellent in dimensional stability, such as ceramics, are generally used for ferrules. With respect to the dimensions of individual parts of the ferrule to be machined, such as the diameter of an optical fiber-inserting hole, and the external diameter and overall length of the ferrule body, there is required extremely high accuracy that errors should be within plus or minus several microns.

As a process for producing a ferrule, for example, such a process as described in Japanese Patent Publication No. 45042/1989 is generally adopted. More specifically, a ceramic material is molded or formed into a cylindrical form having an original hole to be machined into an optical fiber-inserting hole. An extremely thin metal wire is inserted through the original hole to expand the original hole to a desired diameter by abrasion while applying an abrasive material such as diamond paste to the thin metal wire, thereby first machining the optical fiber-inserting hole. It goes without saying that the diameter of the original hole is defined thinner than the desired diameter of the optical fiber-inserting hole to expand such a hole to the desired diameter by abrasion. The molded or formed cylinder is then abraded to the desired external diameter by a diamond wheel or the like on the basis of the position of the optical fiber-inserting hole machined with high accuracy, thereby producing the ferrule. The conventional ferrule 1a obtained by such a process is illustrated in FIG. 2.

However, the ceramic material is considerably hard, and hence takes much time to simply abrade or grind. In addition, it further requires a great many of processes, great cost and much time to machine with high precision that errors be within a mere plus or minus several microns. Therefore, abrading or grinding cost has accounted for most of the production cost of the conventional ferrules. In particular, zirconia is higher in toughness than other ceramics, and its abrading or grinding has involved an extremely serious problem.

The ferrule 1a produced in the above-described manner and illustrated in FIG. 2 has a sharp edge 4 at the boundary between an optical fiber-inserting hole 2 and an optical fiber-inserting opening 3. This edge 4 is naturally formed upon the definition of the optical fiber-inserting hole 2 by the abrasion. When an optical fiber is inserted into the optical fiber-inserting hole 2 of the ferrule 1a, the optical fiber comes into contact with or rubs against this edge 4. As a result, there has been offered a problem that the end surface of the fiber is damaged, and so the transmission of optical information is inhibited, or the side surface of the fiber is damaged, and so the fiber is broken upon its insertion or after the insertion. The body of the ferrule is produced by molding or forming a ceramic material heated and melted. However, the ceramic material undergoes shrinkage after the molding, and so it is said that difficulties are encountered on the definition of the optical fiber-inserting hole 2 having the desired diameter by the molding. For this reason, the conventional process has been always required to define the diameter of a hole to be machined to the optical fiber-inserting hole 2 thinner than the desired diameter upon the molding and expand such a hole to the desired diameter by abrasion after the molding.

In addition, since the inner surface of the ferrule, which defines the optical fiber-inserting hole 2 is abraded with diamond paste or the like, the surface is extremely smooth and close to a specular state. Therefore, the following problem has also been offered. When the optical fiber is inserted into the optical fiber-inserting hole 2 and fixed thereto with an adhesive or the like, an anchoring effect of the adhesive on the inner surface defining the optical fiber-inserting hole 2 cannot be expected, and so the bond strength of the optical-fiber is lowered.

SUMMARY OF THE INVENTION

The present inventor has carried out an extensive investigation with a view toward solving the above problems. As a result, there has been developed a ferrule for an optical fiber connector, which can solve the above problem involved in the prior art that an optical fiber inserted into the ferrule comes into contact with the edge near the opening of the optical fiber-inserting hole and is damaged or broken, and which has a calcined surface at the surface defining the optical fiber-inserting hole, thereby enhancing the bond strength of the optical fiber, thus leading to completion of the present invention.

In an aspect of the present invention, there is thus provided a ferrule for an optical fiber connector, through which an end of an optical fiber to be connected is inserted to fix the optical fiber thereto, wherein a boundary part between an optical fiber-inserting hole and an optical fiber-inserting opening is formed into a convex continuously curved surface such that the fiber inserting hole 2 forms a line tangent to the curved surface.

In the ferrule according to the present invention, the inner surface defining the optical fiber-inserting hole may be an unabraded surface formed of a material as calcined, whereby a slightly irregular grain boundary surface composed of particles of the material is formed at such a surface.

According to the ferrule of the present invention, the boundary part between the optical fiber-inserting hole and the optical fiber-inserting opening is eliminated. Therefore, even when an optical fiber is inserted through the ferrule, the fiber is neither damaged nor broken. Besides, since the surface defining the optical fiber-inserting hole is an unabraded surface formed of a material as calcined, a slightly irregular grain boundary surface composed of particles of the material is formed at such a surface. As a result, the bond strength of the optical fiber can be improved by an anchoring effect of an adhesive.

The above and other objects, features and advantages of the present invention will be readily appreciated from the preferred embodiments of the present invention, which will be described subsequently in detail with reference to the accompanying drawings, and the appended claims.

DETAILED DESCRIPTION OF THE PREFERRED EMBODIMENTS

Figure 1:
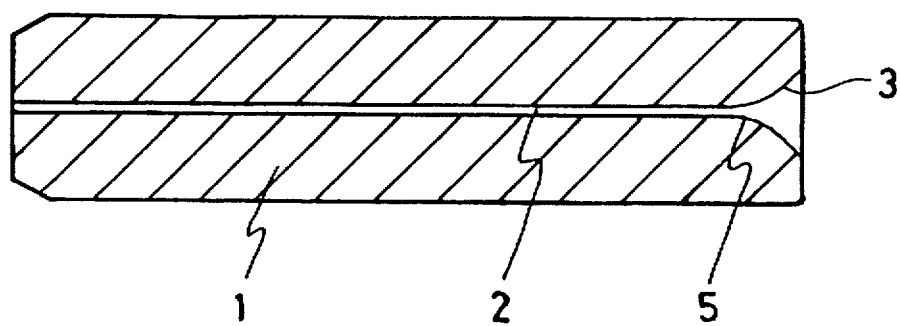
FIG. 1 is a longitudinal cross-sectional view of a ferrule according to the present invention taken along an optical fiber-inserting hole thereof.
Figure 2:
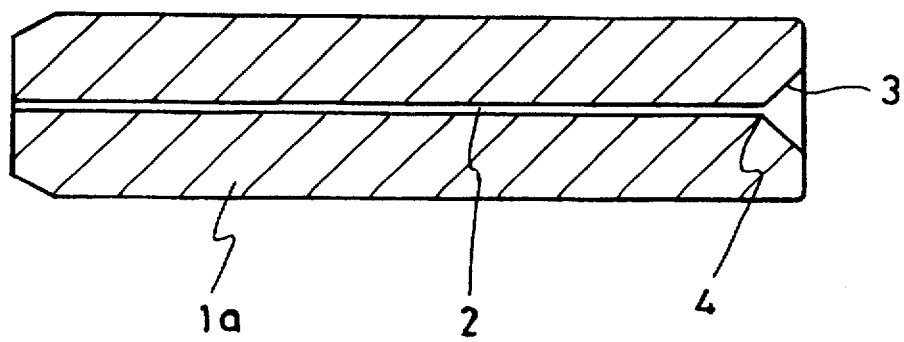
FIG. 2 is a longitudinal cross-sectional view of a ferrule according to the prior art taken along an optical fiber-inserting hole thereof.

As illustrated in FIG. 1, the ferrule 1 according to the present invention has no edge at a boundary part between an optical fiber-inserting hole 2 and an optical fiber-inserting opening 3, which the edge exists in a ferrule 1a according to the prior art as illustrated in FIG. 2. The boundary part is formed into a continuously curved surface 5.

The diameter of the optical fiber-inserting hole 2 defined in the ferrule 1 according to the present invention is within a range of about 0.1–0.2 mm. The diameters of optical fiber-inserting hole 2 of the ferrules presently in practical use are within a range of 0.125–0.128 mm. In general, the length of the fiber-inserting hole 2 is about 10 mm.

In the ferrule 1 according to the present invention, the external diameter is usually about 2.5 mm. However, those having an external diameter of about 1.5 mm are going to be used.

As materials for the ferrule 1 according to the present invention, are used various kinds of ceramics such as alumina and zirconia. The ferrule 1 according to the present invention can be produced by a method such as extrusion or injection molding. In the conventional ferrule 1a, the optical fiber-inserting hole 2 is machined by abrasion after the forming or molding of the ferrule body. In the ferrule 1 of the present invention, however, the optical fiber-inserting hole 2 is not machined by abrasion, but only the external diameter of the ferrule body is defined by grinding. Therefore, the surface defining the optical fiber-inserting hole 2 is a surface formed of a ceramic material as calcined, i.e., a slightly irregular grain boundary surface composed of the ceramic material. Thus, the entire inner surface defining the optical fiber-inserting hole 2 is a surface having a slightly irregular boundary surface. Accordingly, the bond strength between the optical fiber and the ferrule 1 is enhanced owing to the anchoring effect of the adhesive used on the surface defining the optical fiber-inserting hole 2.

In order to obtain the ferrule 1, in which the optical-fiber inserting hole 2-having the desired diameter is defined, as molded or formed without conducting machining by abrasion, it is necessary to select its molding or forming conditions. In order to obtain the ferrule 1 according to the present invention by, for example, injection molding, the following conditions are required. Namely, the cylinder temperature upon injection is preset to 100°–200° C., and the mold temperature is preset to 0°–50° C. In addition, for the ceramic material to be injected, the shear rate at the injection temperature preset is $10^2-10^3$ sec$^{-1}$, and the apparent viscosity at the injection temperature is $10^2-10^4$ dyne·s/cm$^2$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ferrule for an optical fiber connector formed from ceramic material, through which an end of an optical fiber to be connected is inserted to fix the optical fiber thereto, wherein a boundary part between an optical fiber-inserting hole and an optical fiber-inserting opening is formed into a convex continuously curved surface, wherein the entire inner surface defining the optical fiber-inserting hole is an unabraded surface comprising a slightly irregular grain surface composed of particles of the ceramic material as calcined from which the connector is formed.

2. The ferrule according to claim 1 wherein the fiber inserting hole forms a line tangent to the convex continuously curved surface.

3. The ferrule according to claim 1, wherein the ferrule consists essentially of ceramic material as calcined composed of grain particles wherein the grain particles form the inner surface irregularities of the optical fiber-inserting hole.

4. The ferrule according to claim 3, wherein the optical fiber-inserting hole has an inner diameter within the range of 0.1 to 0.2 mm.

5. The ferrule according to claim 3, wherein the ferrule is produced by a method which consists essentially of injection or extrusion molding the ferrule and calcining the molded ferrule.

6. The ferrule according to claim 5 wherein the ferrule is obtained by injection molding a ceramic material at a cylinder temperature upon injection of 100°–200° C. and a mold temperature preset at 0°–50° C.

7. The ferrule according to claim 6, wherein the ferrule is obtained by injection molding a ceramic material at a shear rate of ceramic material at the injection temperature of $10^2-10^3$ Sec$^{-1}$ and apparent viscosity of the ceramic material at the injection temperature of $10^2-10^4$ dynes/cm$^2$.

8. A ferrule for an optical fiber connector, through which an end of an optical fiber to be connected is inserted to fix the optical fiber thereto, wherein a boundary part between an optical fiber-inserting hole and a optical fiber-inserting opening is formed into a convex continuously curved surface, such that the fiber-inserting hole forms a line tangent to the convex continuously curved surface, wherein the entire surface defining the optical fiber-inserting hole consists essentially of an unabraded surface composed of as calcined ceramic material grain particles whereby a slightly irregular grain surface is formed and wherein the grain particles form the inner surface irregularities.

9. The ferrule according to claim 8, wherein the optical fiber-inserting hole has an inner diameter of 0.125 to 0.128 mm.

10. The ferrule according to claim 8, wherein the ferrule is produced by a method which consists essentially of injection or extrusion molding the ferrule and calcining the molded ferrule.

11. The ferrule according to claim 8, wherein the ferrule is obtained by injection molding a ceramic material at a cylinder temperature upon injection of 100°–200° C. and a mold temperature preset at 0°–50° C.

12. The ferrule according to claim 11, wherein the ferrule is obtained by injection molding a ceramic material at a shear rate of ceramic material at the injection temperature of $10^2-10^3$ Sec$^{-1}$ and apparent viscosity of the ceramic material at the injection temperature of $10^2-10^4$ dynes/cm$^2$.

13. The ferrule according to claim 3, further comprising an optical fiber contained therein and adhesively bonded to said ferrule.

14. The ferrule according to claim 4, further comprising an optical fiber contained therein and adhesively bonded to the inner surface irregularities of the optical fiber inserting hole of said ferrule.

15. The ferrule according to claim 8, further comprising an optical fiber contained therein and adhesively bonded to said ferrule.

16. The ferrule according to claim 9, further comprising an optical fiber contained therein and adhesively bonded to the inner surface irregularities of the optical fiber inserting hole of said ferrule.

17. A process for preparing the ferrule of claim 4, by injection molding.

18. A process for preparing the ferrule of claim 9, by injection molding.

* * * * *